United States Patent [19]

Kennett

[11] 4,269,141
[45] May 26, 1981

[54] APPARATUS FOR CLEANING THE WHEEL ARCHES OF VEHICLES

[76] Inventor: John E. Kennett, 11a Vinery Rd., Bury St. Edmunds IP33 2JT, England

[21] Appl. No.: 958,338

[22] Filed: Nov. 7, 1978

[51] Int. Cl.³ .............................................. B05B 3/00
[52] U.S. Cl. .................................... 118/708; 118/313; 118/315; 118/316; 118/317; 118/323; 118/73; 134/123
[58] Field of Search ............... 118/305, 315, 317, 323, 118/313, 73, 316, 708; 134/123

[56] References Cited

U.S. PATENT DOCUMENTS

| | | | |
|---|---|---|---|
| 3,448,717 | 6/1969 | Kuhlman | 118/680 |
| 3,783,819 | 1/1974 | Hammelmann | 118/305 |
| 3,795,254 | 3/1974 | Blosser | 134/123 |
| 3,973,988 | 8/1976 | McMahan | 134/123 |

FOREIGN PATENT DOCUMENTS

1442258  7/1976  United Kingdom .................... 134/123

Primary Examiner—John D. Smith
Attorney, Agent, or Firm—Fleit & Jacobson

[57] ABSTRACT

Apparatus for cleaning the wheel arches of vehicles comprises a carrier, pivotally mounted about a substantially horizontal axis, on support means, a spraying unit slidably mounted on the carrier and movable substantially inwards and outwards relative to the pivotal axis of the carrier, means for moving the support means whereby the spraying unit is brought into a position alongside a wheel for spraying with the pivotal axis of the carrier adjacent to and substantially parallel with the axis of the wheel, means for moving said spraying unit inwards and/or outwards in relation to said pivotal axis of said carrier and means for pivoting the carrier about the pivotal axis relative to said support means.

36 Claims, 14 Drawing Figures

APPARATUS FOR CLEANING THE WHEEL ARCHES OF VEHICLES

BACKGROUND OF THE INVENTION

This invention relates to apparatus for cleaning the wheel arches of vehicles, particularly road vehicles.

The harmful effects of dirt accumulating on the under sides of vehicles have been greatly increased by the extensive use of salt by the authorities to prevent road surfaces from freezing, such salt even at low concentrations having a very corrosive effect.

Nowhere is the effect more pronounced than in the wheel arches. Not only are these the areas where most dirt is thrown up by the wheels but, being inaccessible and concealing traps and other surfaces where dirt can lodge, they are the areas most difficult to clean, unless the vehicle is raised and its wheels removed, which is inconvenient and expensive.

An object of the present invention is to provide means whereby the wheel arches may be rapidly and thoroughly cleaned without the need to raise the vehicle from the ground or to remove its wheels.

Further objects are to enable rust-inhibiting chemicals to be applied to the wheel arches after the dirt has been removed and to enable the outer surface of wheels to be cleaned as a continuation of the first operation with the same basic apparatus.

SUMMARY OF THE INVENTION

The invention provides apparatus for cleaning the wheel arches of vehicles comprising a carrier, pivotally mounted about a substantially horizontal axis, on support means, a spraying unit slidably mounted on the carrier and movable substantially inwards and outwards relative to the pivotal axis of the carrier, means for moving the support means whereby the spraying unit is brought into a position alongside a wheel for spraying, with the pivotal axis of the carrier adjacent to and substantially parallel with the axis of the wheel, means for moving said spraying unit in relation to said pivotal axis of said carrier and means for pivoting the carrier about the pivotal axis relative to said support means.

Advantageously, the wheel which constitutes a common factor to all wheel arches, according to the present invention, serves as a guide for a spraying unit which is caused to home on the wheel and then move through an arc corresponding approximately to the arc extending from 8 o'clock, through 12 o'clock on a clock face, to 4 o'clock, and back again. The spraying unit embodies a plurality of nozzles adapted to discharge water both radially and substantially tangentially to the wheel, and thus cleanse the surrounding wheel arch.

DESCRIPTION OF DRAWINGS

The invention will now be more particularly described with reference to the accompanying drawings, in which.

DESCRIPTION OF PREFERRED EMBODIMENTS

Figure 1:
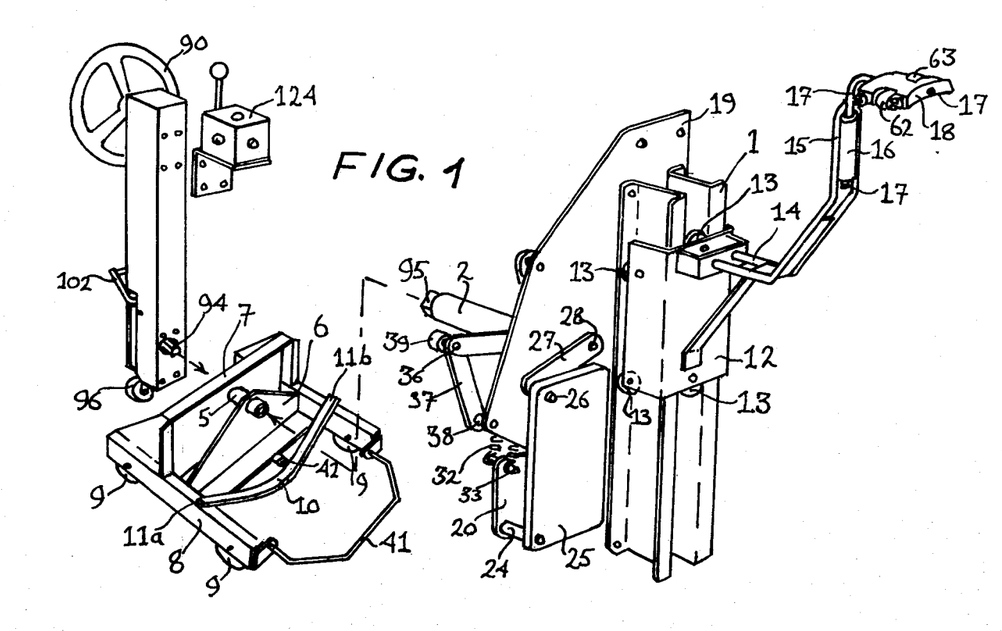
FIG. 1 shows a perspective view of a carrier, its mounting on a trolley, and a control mast for pedestrian operation.

A carrier shown in FIG. 1 conveniently comprises a pair of channels, 1, held in juxtaposition, back to back, by suitable crossmembers, to form an arm, and a plate, 19. The purpose of the carrier is to provide a slidable mounting for a spraying head and to support a means to control the spraying head.

Figure 2:
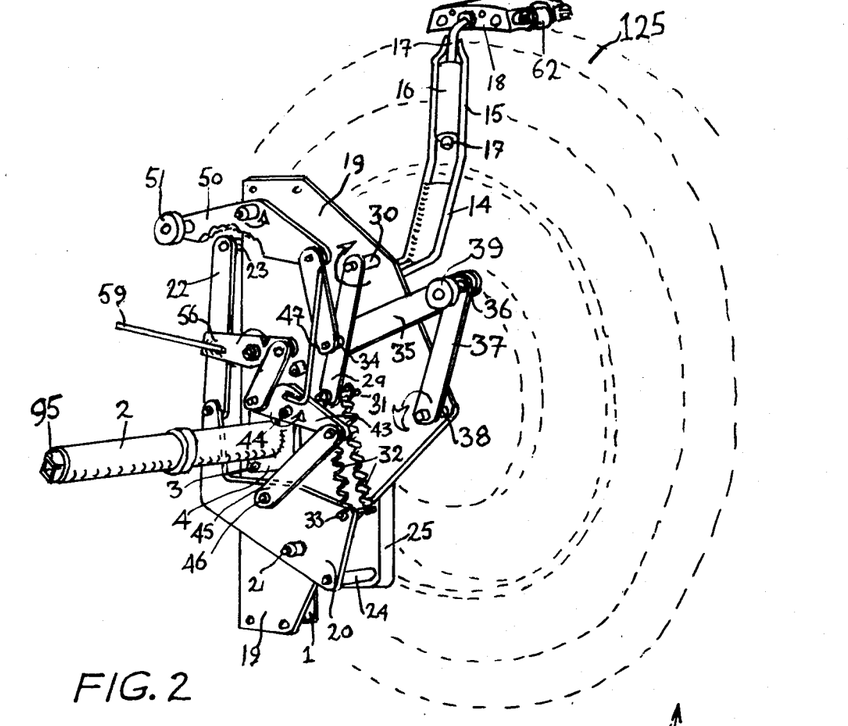
FIG. 2 shows a perspective view of the reverse side of the carrier to that shown in FIG. 1.

The channels, 1, and the plate, 19, are attached to a tubular shaft, 2, by bolts, 3, passing through a flange, 4, integral with shaft 2, (See FIG. 2).

The shaft, 2, is pivotally mounted on a horizontal axis in tube, 5, which is rigidly supported by vertical plates, 6 and 7, which form part of a support means for the carrier, referred to henceforth as the trolley, and a preferred form of which is shown in FIG. 1.

The vertical plates, 6 and 7, and side members, 8, which conveniently are of channel construction form a rigid welded frame running on four wheels, 9.

The lower extremity of plate, 6, is bent forwards through 90 degrees, and then again upwards through 90 degrees to support a central arcuate strip, 10, with a straight surface at each side, 11a and 11b and these three elements, 10, 11a and 11b combining to form a cam. This cam, together with roller 42, combine with the components shown on the nearside of plate 19, in FIG. 2, to control inward and outward movement of the spraying unit in relation to the axis of tube 2. The spraying unit is based on a saddle 12, which moves freely on wheels, 13, within the confines of the channels 1. Rod 17, integral with rods 14, supports nozzle unit 18, shown in detail in FIG. 3.

Figure 5:
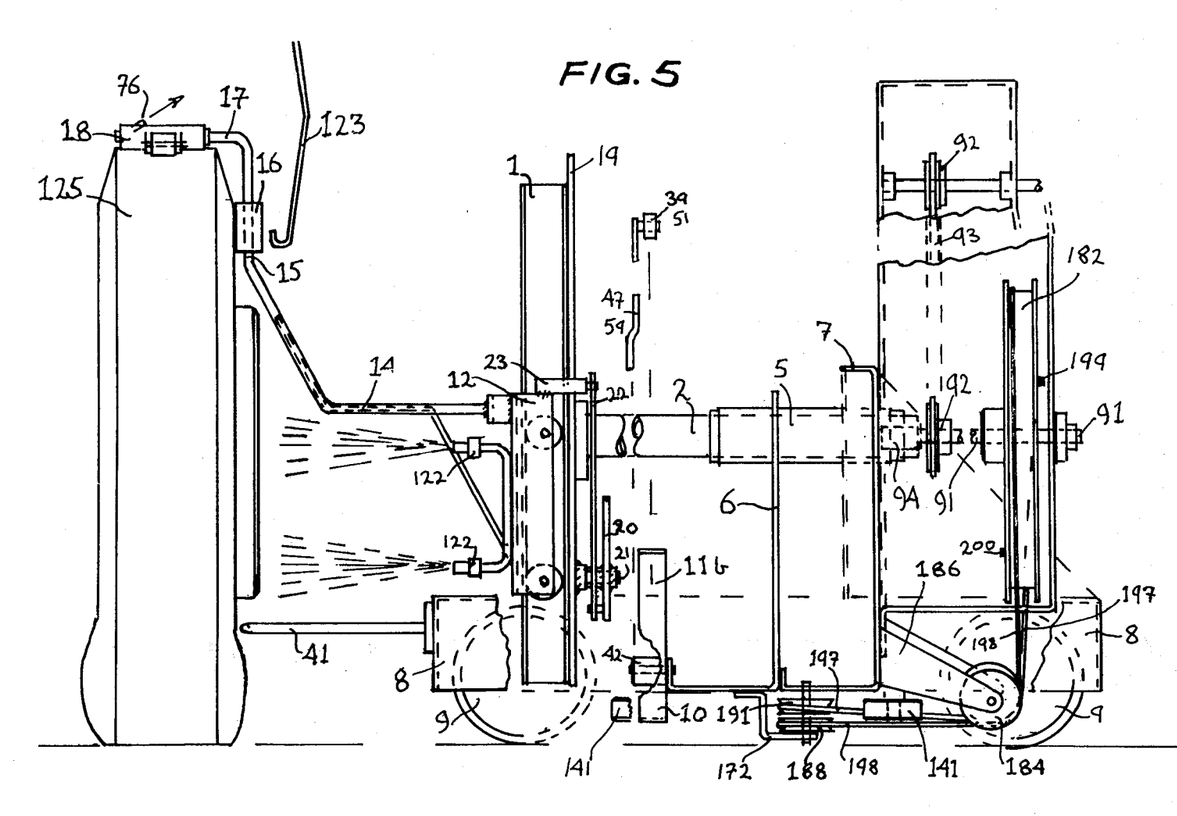
FIG. 5 shows a side elevation of a trolley and carrier.

Referring to FIG. 5, the bellcrank lever 20, shown also in FIG. 2, is connected by a tension/compression link 22 to pin 23 integral with saddle 12. Other details are omitted, for clarity, but rollers, 39 and 51, will be seen to be in the vertical plane of cam 10 11a, 11b, and rods 47, 54, in the vertical plane of roller 42. Their action will be described later.

The basic trolley shown in FIG. 1 can be adapted according to whether the apparatus is to be used as a single unit which is to be moved from one wheel to another, or as part of an installation in which more than one such apparatus may be employed, as described later with reference to FIGS. 6, 7, 8 and 9. It provides the means by which the spraying unit moves towards or away from the wheels whose surrounding arches are required to be cleaned. The height of the axis of tube 5, above the ground, corresponds to the average rolling radius if such wheels.

When the apparatus is used in combination with conventional car washing equipment, for example equipment of the three brush "roll over" type, the tube 5 is mounted at a similar height, with the cam elements 10, 11a and 11b in a similar position relative to it, but other means of supporting it may be preferred.

A square-section tube, 95, adapts the tubular shaft, 2, with which it is integral, to receive whatever form of drive is preferred for swivelling the carrier through its arc of operation from the 8 o'clock, through 12 o'clock to the 4 o'clock position, and back again. This arc will be referred to henceforth as the Operational Arc and the position of the channels, 1, will be described in relation to the Figures on a clock face.

Figure 4:
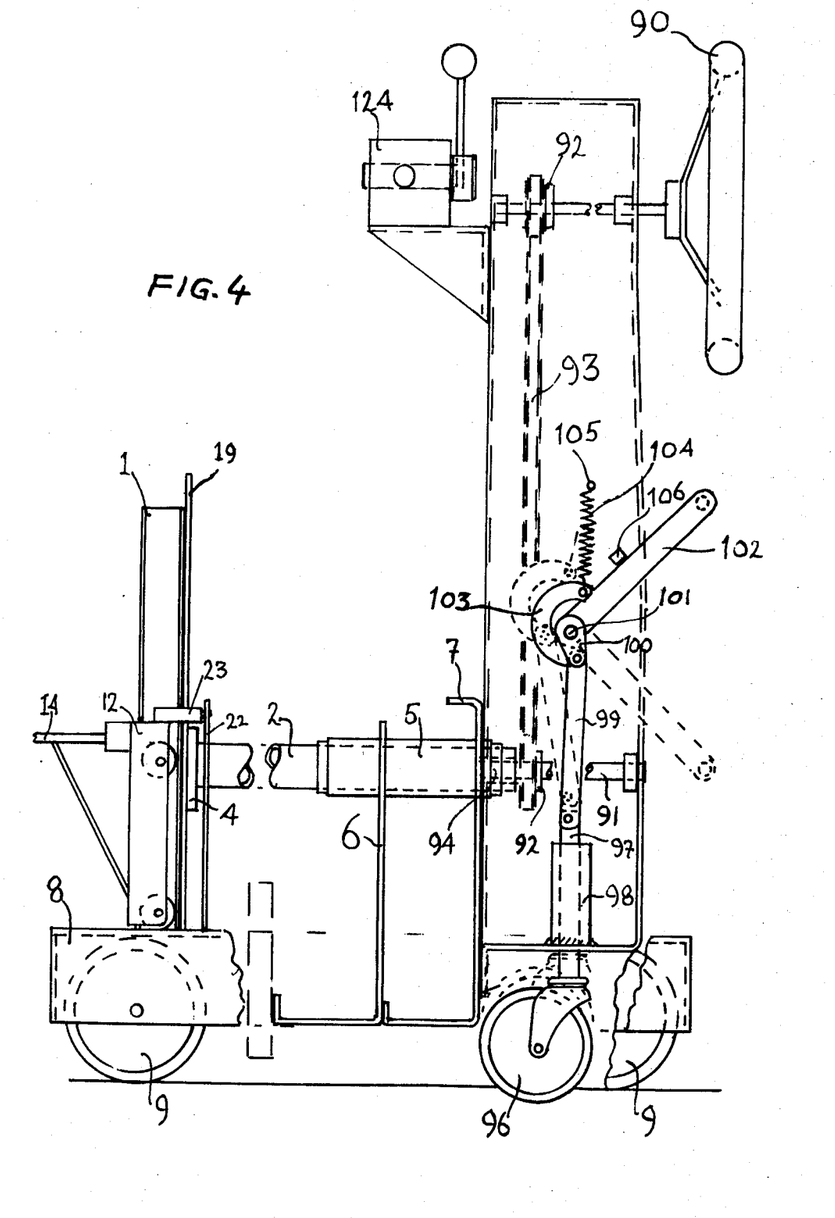
FIG. 4 shows details of the mast shown in FIG. 1.

When the apparatus is used as a single unit, a control mast is provided as shown in the perspective view in FIG. 1, and in a cut away side elevation in FIG. 4.

The mast is rigidly attached by bolts to the rear plate, 7, of the trolley. A handwheel, 90, drives shaft, 91, through sprockets 92 and chain 93. Integral with shaft, 91, is a square section bar, 94, seen in FIG. 1 which engages the square section tube 95 integral with tube, 2.

For ease of movement from one wheel of a vehicle to another, it is convenient to raise the rear wheels of the trolley clear of the ground and support the rear end of the apparatus on a swivelling castor wheel, which can be withdrawn when the apparatus is in position for the next wash. The castor wheel 96, is attached to a vertical shaft, 97 sliding in tube 98 rigidly attached to the mast, See FIG. 4.

Shaft, 97, is connected by a pair of tension/compression links, 99, to the arms, 100, of a horizontal shaft, 101, of which the handle, 102, also forms an integral part. Shaft, 101, is pivotally mounted between the upright sides of the mast, and the arms, 100, are connected, by a U-shaped member 103, and a spring, 104 to transverse rod, 105, the U-shaped member permitting the line of pull of the spring to pass through the axis of shaft, 101.

Raising the handle, 102, until it is checked by stop, 106, rotates shaft, 101, (anti-clockwise in FIG. 4) depressing vertical shaft, 97, and transferring the weight to the castor wheel. Rotation of shaft 101, raises the castor wheel, so that the weight is taken once again on all four of the trolley wheels, 9, thus preventing unwanted sideways movement of the trolley during operation of the apparatus. The castor wheel is held in the selected position whether raised or lowered, by the action of the spring, 104.

The apparatus so far described provides means for bringing the carrier, comprising channels, 1, and plate, 19, alternatively into or out of position adjacent to the wheel of a vehicle, and for swivelling it through its Operational Arc. The mounting of the apparatus for single unit application on a trolley, as described above, is chosen as the preferred embodiment for purposes of this description, because the provision of apparatus for cleaning two or more arches simultaneously must necessarily be preceded by the availability of effective apparatus for cleaning a single one, which can be adapted to other applications, when necessary.

Figure 3:
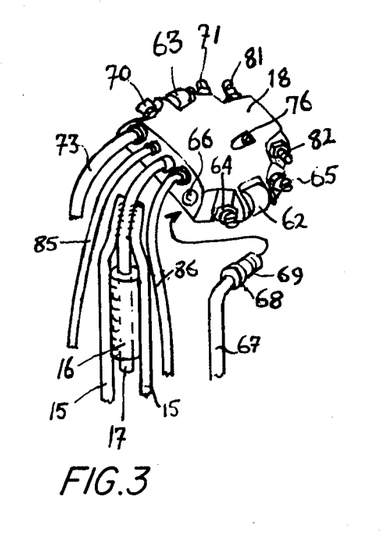
FIG. 3 shows a perspective view of a nozzle unit.
Figure 3A:
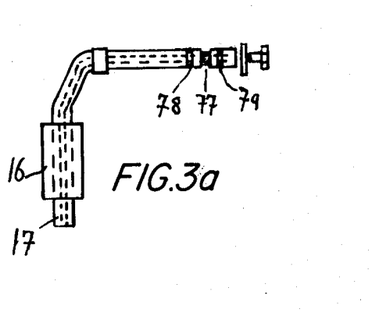
FIGS. 3a and 3b show details of different nozzles used in the nozzle unit.
Figure 3B:
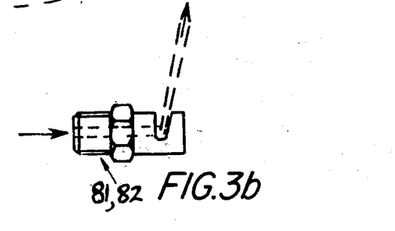

Referring to FIG. 3, the nozzle unit 18 is mounted, preferably pivotally, on a horizontal axis provided by rod 17, which is integral with the outer extremeties of parallel support rods 14. The downwards extension of rod, 17, supports a roller, 16, situated and rotating freely between a section, 15, of support rods 14 which section is substantially perpendicular to the axis of the carrier, i.e. tube 2. The nozzle unit 18 is slightly arcuate and incorporates rollers 62 and 63 mounted on axes, parallel to that of the nozzle unit itself, these rollers being adapted to follow the tread of the tire while roller 16 follows the wall, the pivotal mounting of the block permitting the rollers to remain in contact with the tire irrespective of any misalignment which may occur, for example if the rolling radius of the wheel is smaller or greater that the height of axis 2 above the ground.

Nozzles 64 and 65 are supplied with fluid through gallery, 66, by a rigid tube, 67, terminating in plug, 68, furnished with an "O" ring, 69, which provides a seal with the internal surface of the gallery, 66, without interfering with the pivotal movement of the block, 18, on rod, 17. The nozzles, 64 and 65 are arranged to provide preferably flat V shaped streams of fluid, directed substantially at a tangent to the periphery of the wheel, so that the cleaning fluid follows a path corresponding to that taken by mud particles when they were first thrown up from the road by the wheels. Correspondingly, nozzles 70 and 71 supplied by tube, 73, provide V shaped jets, but at the opposite tangent to those provided by nozzles 64 and 65.

A nozzle, 76, directs a fluid in an outward and slightly upward direction, as shown in FIG. 5, to cleanse the inner surfaces of mudguards, 123. The solid rod, 17, is replaced by a tube of similar diameter and configuration through which fluid is supplied through aperture 77 and an internal lateral gallery, not shown in block, 18, to nozzle 76, "O" rings 78 and 79 providing a seal on either side of aperture, 77.

The supply of fluid in tubes 67, 73 and 17 is preferably controlled independently, to concentrate the force as well as to avoid wastage of fluid when the jets cease to be effectively directed.

A chemical method of inhibiting corrosion employs two fluids which combine to form a precipitate when applied one after another to a metal surface. Such fluids may be applied by means of nozzles, 81 and 82 mounted at the outer extremity of block, 18, throwing a V-shaped jet upwards. These are supplied by tubes 85 and 86, the sealing arrangement being the same as that indicated for tube 67. The present invention concerns only the method of application of such fluids to wheel arches; it is not concerned with their chemistry.

The rigid tubes carrying fluid to nozzle unit 18, are supplied by flexible tubes to permit the rotation of the carrier through its operational arc, and the inwards and outward movement of the spraying unit. For reasons of clarity, these flexible tubes are not shown in the accompanying figures. Those skilled in the art will have no difficulty in arranging them, or in introducing detergents when required, into the water supply.

Conveniently, means for cleaning the outer surfaces of wheels are incorporated in the apparatus. For this purpose, nozzles, 122, mounted on saddle, 12, direct preferably V shaped jets towards the wheel face as shown in FIG. 5. Rotation of the carrier, and thus the saddle, 12, through the operational arc, ensures that no part of the wheel face is missed.

The spraying head is seen in its 12 o'clock position, in engagement with a wheel, 124, in FIG. 5. The cranked form of the support rods, 14, and the provision of the vertical section, 15, enable the nozzle unit to follow the wall and the periphery of the tire through the full operational arc without fouling the mudguard, 123. This mudguard is typical of rear mudguards on many makes of vehicle. Often however the upper parts of the rear wheels are shrouded to a level only slightly higher than the hub of the wheel. In such case the horizontal section of the rods, 14, is far enough away from the nozzle unit, 18, to be able to pass clear beneath the mudguard. Correspondingly, the clearance between the vertical section, 15, of the support rods, 14, and the channels, 1, is such that the carrier can usually be swivelled through its operational arc without fouling the coachwork of the vehicle.

Water is supplied under pressure to the nozzle unit, 18, by the rigid tubes shown in FIG. 3 and flexible hoses which, for purposes of clarity, have been omitted from the drawings.

When the apparatus is used as a single unit, water is supplied from a remotely situated pump, the flow being diverted from one set of nozzles to another by a rotary valve, 124, preferably mounted on the mast within easy reach of the operator, as shown in FIG. 4.

Two important features of the invention are that wheel arches may be cleaned without the need to raise the vehicle from the ground, and the slidable mounting of the spraying unit in channels, 1, permits the nozzle unit to follow the peripheries of wheels of widely differing diameters. This is made possible by the mechanism for controlling the inward and outward movements of the spraying unit in relation to the axis of the carrier, which will now be described.

When the trolley has been aligned with the wheel, it is moved inwards towards the longitudinal centre line of the vehicle, with the nozzle unit held in the 4 o'clock or 8 o'clock position at a sufficient distance from the axis of the wheel, so that it can pass through the gap between the coachwork and the ground, this inward movement being checked when a buffer bar, 41, see FIG. 1, reaches the lower part of the tire, at which stage the roller 16 is aligned with the outer wall of the tire.

The inward and outward movement of the spraying unit in relation to the pivotal axis of the carrier is effected entirely by the swivelling of the carrier, whether by rotation of the handwheel, 90, in FIG. 1, or by other means.

Figure 8:
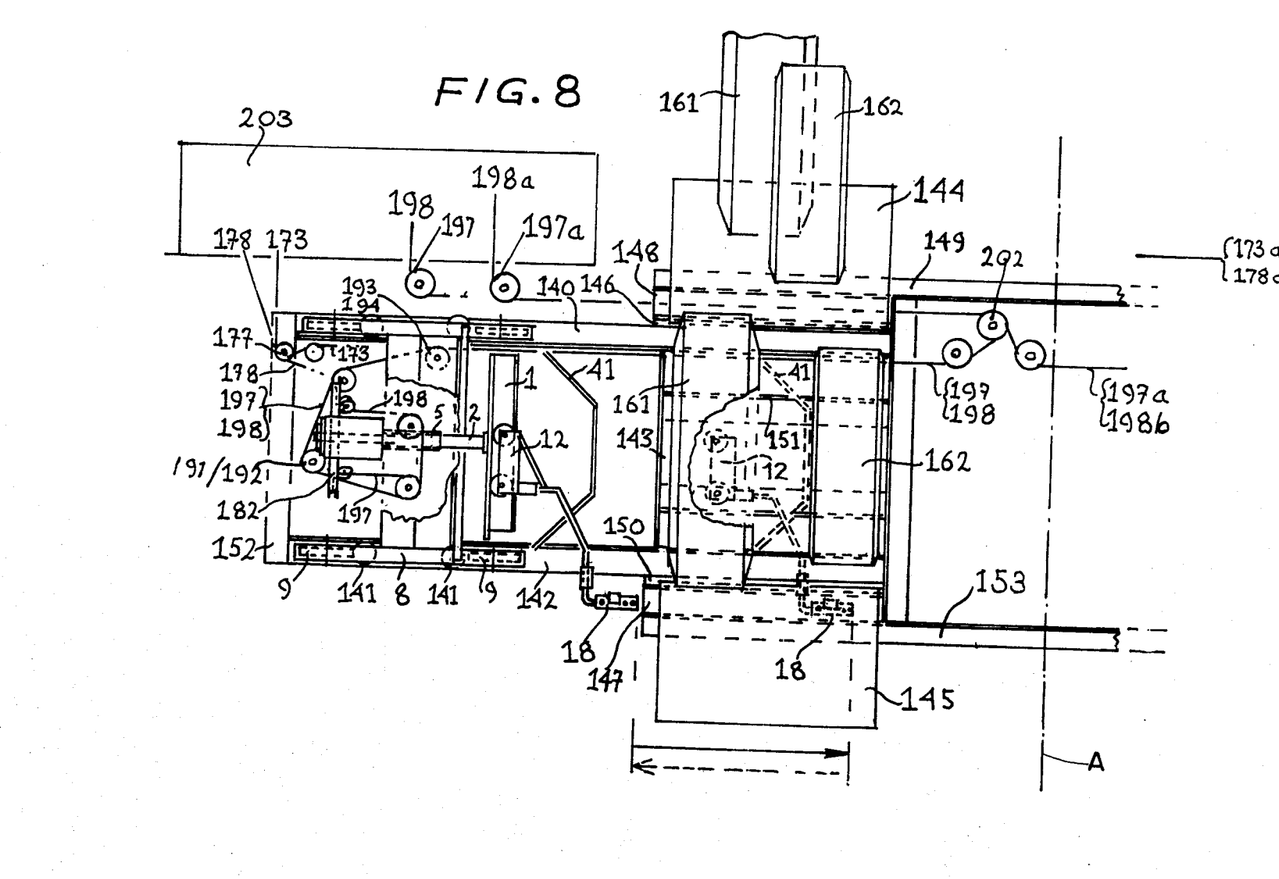
FIG. 8 shows a plan view of one half of an arrangement enabling trolleys to operate on opposed sides of a vehicle.

The mechanism shown in FIGS. 1 and 2 controls the movement of the spraying head between the 12 o'clock and 4 o'clock position as seen in FIG. 8.

It is advantageous but not always necessary to provide a complementary mechanism to provide similar control at the opposite end of the Operational Arc, that is to say between the 12 o'clock and 8 o'clock positions.

The functions of these respective mechanisms are threefold: first, the rollers 62, 63 of the nozzle unit, 18, must be brought into contact with the periphery of the tire as soon as possible to ensure that the nozzle unit hugs the tire as closely as possible before it reaches the 3 o'clock (or 9 o'clock) position where gaps between tires and coachwork are often very small. Secondly, the nozzle unit must be held in contact with the periphery of the tire at an appropriate pressure while the carrier is swivelled through its Operational Arc. Thirdly, at the end of a wash, the nozzle unit must be withdrawn radially, away from the periphery of the tire into its parking position at 4 o'clock, (or 8 o'clock) in which it can be removed without damage when the trolley is withdrawn and in which it will be correctly disposed for engaging the next wheel whose arch it is required to wash.

When the arm, 1, is in the upper arc of its travel, i.e. between the 10 o'clock and 2 o'clock positions as in FIG. 2, the weight of the spraying unit is sufficient to maintain the rollers 62, 63, in contact with the tire as in FIG. 5. Below the 10 o'clock and 2 o'clock positions, the effects of gravity lessen and below the 9 o'clock and 3 o'clock positions they draw the spraying unit outwards.

Between the 11 o'clock and 1 o'clock positions, almost the whole weight of the spraying unit together with its water supply hoses and tubes is supported by the rollers 62, 63, of the nozzle unit. These rollers are necessarily small, to allow the nozzle unit to pass through small gaps, and it is therefore desirable to reduce the load which they must support, by the provision of a counterweight, the reduced friction in its turn facilitating the swivelling of the carrier through this section of the Operational Arc.

To perform the various functions referred to, it is convenient to associate linear movement of the spraying unit with pivotal movement of the lever, 20, already referred to, which lever takes the form of a composite bellcrank, pivotally mounted on pin 21, integral with plate, 19. Integral with bellcrank lever, 20, is a pin 24 projecting forwards and pivotally supporting one end of a counterweight plate, 25. The opposite end of the counterweight plate is supported by pin, 26, integral with arm, 27, which is pivotally mounted on axis, 28. The axes 21, 24, (See FIG. 2) 26 and 28 (See FIG. 1) form a parallelogram based on axes 21 and 28, the arrangement being such that the action of the counterweight is greatest when the arm, 1, is vertical and reduces to insignificance as the 3 o'clock or 9 o'clock positions are reached. At that stage, force must be exerted to hold the nozzle unit against the tyre tread, the force required increasing as the arm approaches the 4 o'clock (or 8 o'clock) positions.

The force is exerted by means of a linkage comprising a lever, 29, (FIG. 2) pivotally mounted on pin, 30, integral with plate, 19, and carrying at its free end a pin, 31. Pin 31, is connected by a pair of tension springs 32, to pin 33, integral with the bell crank lever, 20. Pin 34 integral with lever 29 is connected by link 35, to pin 36 integral with lever 37, which is pivotally mounted on pin 38, integral with plate 19. Roller 39 is mounted on pin 36, and moves in the same vertical plane as the arcuate strip 10, and the inclined straight surfaces 11a and 11b at either end of it, as seen in FIG. 1. With the arm in the upright position as shown in FIG. 1, the linkage just described is entirely free and exerts no force on the bellcrank lever, 20.

As the arm, 1, is swivelled to the 3 o'clock position (clockwise in FIG. 2) the roller encounters the cam surface, 11a. Further rotation of the carrier causes anti-clockwise rotation of lever, 37, with corresponding clockwise rotation of lever, 29. This, in turn, exerts a pull on springs, 32, such a pull having the effect of urging lever, 20, anti-clockwise, to pull the spraying unit inwards and thus maintain the nozzle unit in contact with the tire. This inward pull starts at approximately the same stage as gravity ceases to play a part in holding the nozzle unit, 18, against the tire, and continues to the end of the Operational Arc at which stage roller, 39, is in engagement with the arcuate strip, 10, just below the roller, 42. (FIG. 1).

Meanwhile, towards the end of the Operational Arc, the nozzle unit must be withdrawn clear of the tyre. This is accomplished by a second linkage (See FIG. 2)

comprising a lever, 43, pivotally mounted on pin, 44, integral with plate, 19, whose free end is connected by link, 45 to pin, 46, integral with lever, 20, any movement of which involves rotation in the opposite direction, of lever, 43, and vice versa. Rod 47, is integral with lever, 43. As rotation of the arm, 1, continues past the 3 o'clock position, rod, 47, encounters the roller, 42 (see FIG. 1). Continued rotation causes anti-clockwise pivoting of lever, 43, which in turn causes the clockwise movement of lever 20, needed to urge the spraying unit outwards and thus bring the nozzle unit free of the tire and into its parking position.

Complementary functions at the opposite end of the Operational Arc just described are performed by levers, 50 and 56. These co-act respectively with levers 37 and 43, but in opposite directions. The same pull is exerted on springs 32, whether the lever 29 is rotated clockwise by the action of roller 39 following cam 11a or roller 51 following cam 11b. Like rod 47, rod 59, encounters roller 42, but from the opposite direction, to withdraw the nozzle unit to its parking position, as it passes anti-clockwise from the 9 o'clock to the 8 o'clock position.

Where rapid operation is needed or where space is limited, separate apparatuses may be provided for use on opposite sides of a vehicle. Conveniently a pair of rails is provided at each side, both to guide the trolleys into work and to locate the front, or rear, pairs of wheels.

Figure 6:
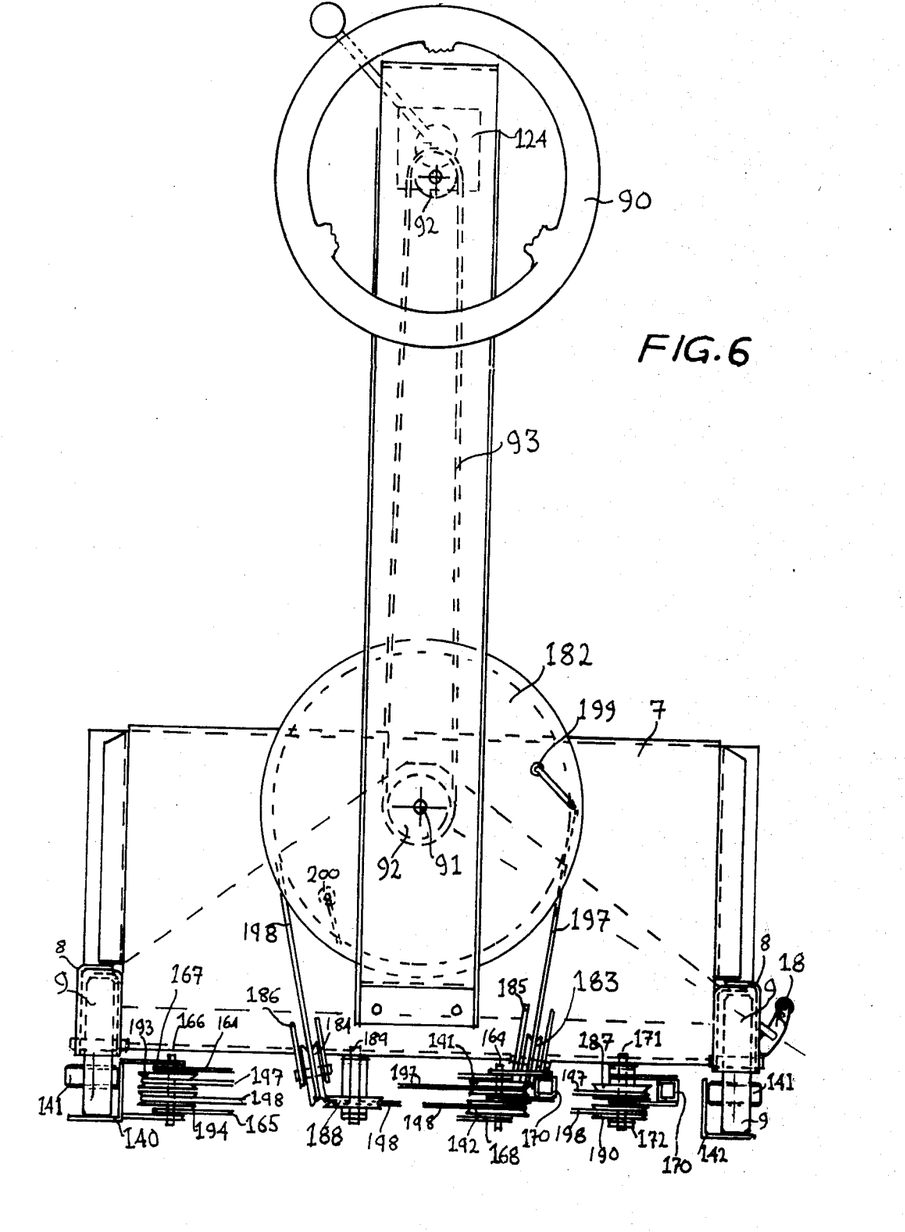
FIG. 6 shows a rear elevation of a trolley adapted to run on rails.

FIG. 6 shows an apparatus with its wheels 9, running on angle irons, 140, and 142, and guided by rollers 141.

In FIG. 8 the line A is the center line of an installation in which two apparatuses are to be used, the arrangement on the far side of the vehicle, not shown, being either identical or the mirror image of that described. Parallel angles 140, 142, are held in juxtaposition by a concave plate 143, which is seen in end elevation in FIG. 7, and an end plate 152. Ramp 144 is supported on angles 146 and 149, held in juxtaposition by plate 148. Ramp 145 is similarly supported on angles 147 and 153 held in place by plate 150.

Figure 7:
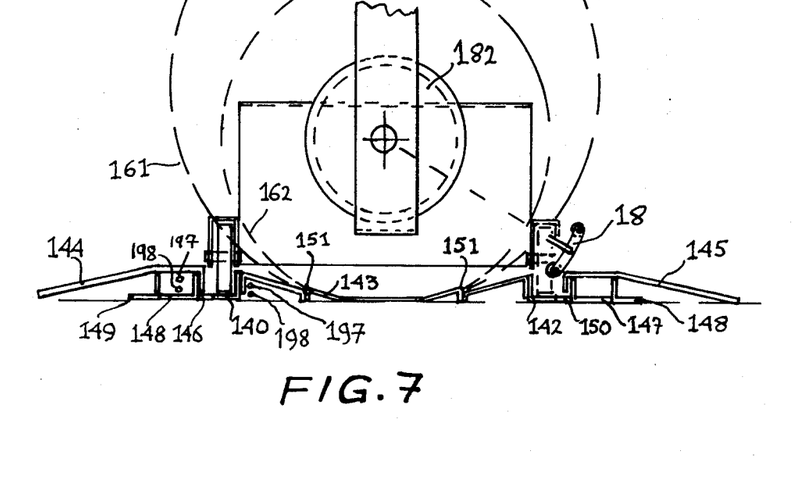
FIG. 7 illustrates a convex plate in which vehicle wheels may be located.

The concave plate 143, FIG. 8, is of sufficient width to accommodate either the wheels, 161, of a large vehicle which has been driven somewhat to the left of the centre line, a the wheel, 162, of a small vehicle driven somewhat to the right. Wheels are located on the concave plate, as seen in FIG. 7, ridges, 151, providing a grip for the driving wheels. The trolley may be moved from its outer position where nozzle unit, 18, is clear of the path of wheel 161 to engage wheels 161 or 162, or any wheel between those two positions.

Figure 9:
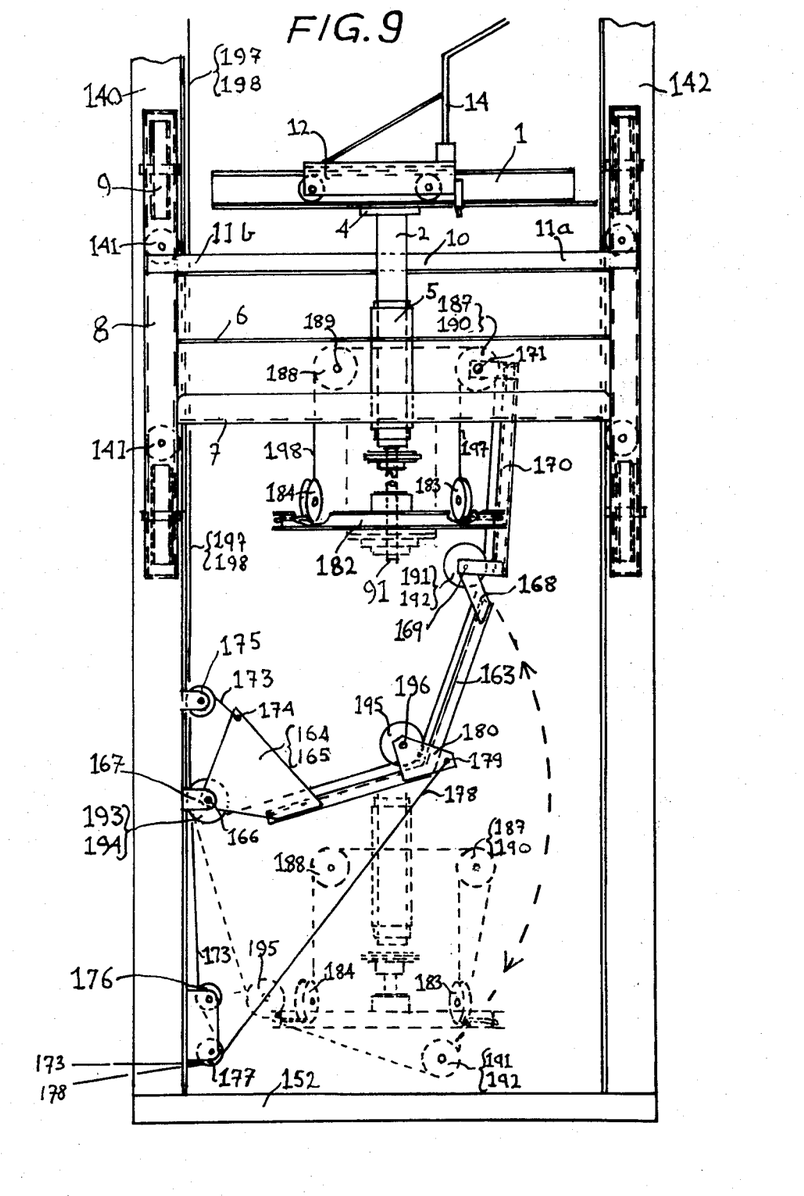
FIG. 9 shows a plan view of a trolley and the manner in which its inward and outward movement and the rotation of the carrier can be accomplished, from a distance, by a system of cables.

When one operator has to use two apparatuses simultaneously, remote control means must be provided for at least one of them. Such means are shown in FIG. 9 where a trolley is shown in chained lines in its outer position and in full lines in the inner position it would occupy to engage wheel 162.

Cranked channel member, 163, is held between plates 164 and 165 (see FIG. 6) pivotally supported by pin 166 passing through lug 167 attached to the inner face of angle 140, allowing it to swing through an arc of about 90 degrees. At its free end are a pair of plates, 168, through which passes pin 169, which is connected by box-section link 170 to pin 171 passing between the horizontal part of plate 7 and bracket 172 as seen in FIG. 3. Inward and outward movement of the trolley is thus accompanied by swivelling of arm 163. For clarity pin 171 is shown in FIG. 6 further to the right than its actual position as shown in FIG. 9.

Cable 173 attached to pin 174 in plates 164, passes round sheaves 175, 176, and 177, through an aperture in angle 140. Pulling cable, 173, from a remote position causes cranked arm, 163, to swivel anticlockwise, to bring the apparatus into its workings position. Correspondingly, cable 178, attached to pin 179, passing through plates, 180, integral with cranked arm 163, passes round a pulley either above or below pulley 177 and thence through angle, 140, to a remote position, from which a pull on the cable will swivel arm 163 clockwise to withdraw the apparatus to the parking position shown in chained lines in FIG. 9.

Conveniently, the axes 166, 169 and 171 of the cranked arm 163 and the link 170 are used to support a system of sheaves and cables adapted to cause rotation of the carrier on shaft 2, by means of wheel 182 keyed to shaft 91 (FIG. 5). Alternatively, rotation of shaft 91, by means of the handwheel, 90, chain and sprockets can be made to cause corresponding rotation of the apparatus on the far side of the vehicle.

Sheaves 183 and 184, supported on bracket 185 and 186 (FIG. 6) are in alignment with wheel 182 and also in alignment, respectively with sheaves 187 and 188, the latter rotating about pin 189 supported by a bracket corresponding to that shown as 172 in FIG. 5. Sheave 188 is in alignment with sheave 190 rotating about pin 171 below sheave 187. Sheaves 187 and 190 are, in turn, in alignment with sheaves 191 and 192, rotating on pin 169 and sheaves 193 and 194 rotating on pin 166.

In order to avoid fouling sheave, 184, when the trolley is fully withdrawn to the position shown in chained lines in FIG. 9, the cranked arm 163 is provided with sheaves 195 rotating about pin 196 passing through plates 180. These sheaves do not affect the geometry and are omitted for clarity in FIG. 6.

The cables, 197 and 198 passing round wheel 182 are anchored respectively to pins 199 and 200, these being on opposite sides of the wheel allowing the cables to lie alongside each other. The nozzle unit, 18, is shown in its parked position at 4 o'clock. Anti-clockwise rotation of wheel 182, e.g. by means of a handwheel 90 causes a pull on the cable 197, which passes in each case round the upper sheaves, while cable 198 is paid out, passing round the lower sheaves of the pulley system. Referring to FIG. 8, cables 197, after passing under the concave plate 143 emerge in the area of the center line A, where they encounter the corresponding cables 197a and 198a, actuating the machine on the far side.

Any such cables can be passed round pulley 202 and thence between angles 146 and 149 (FIG. 7) back to the area 202, to which cables 178 and 183, from the near side and 178a and 183a from the far side are also led. Inward and outward movement of the apparatuses, and their rotation through their operational arcs is thus only a matter of pulling or releasing a number of cables from a central control point.

Figure 10:
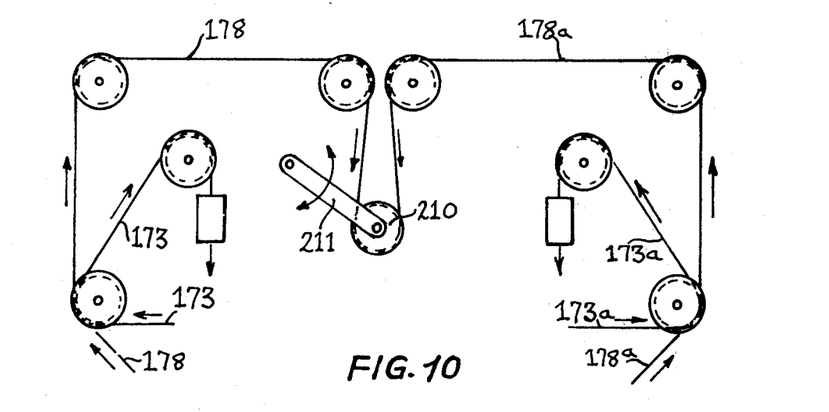
FIG. 10 shows, diagrammatically an arrangement of cables for accomplishing the inward and outward movement of a pair of opposed apparatuses.
Figure 11:
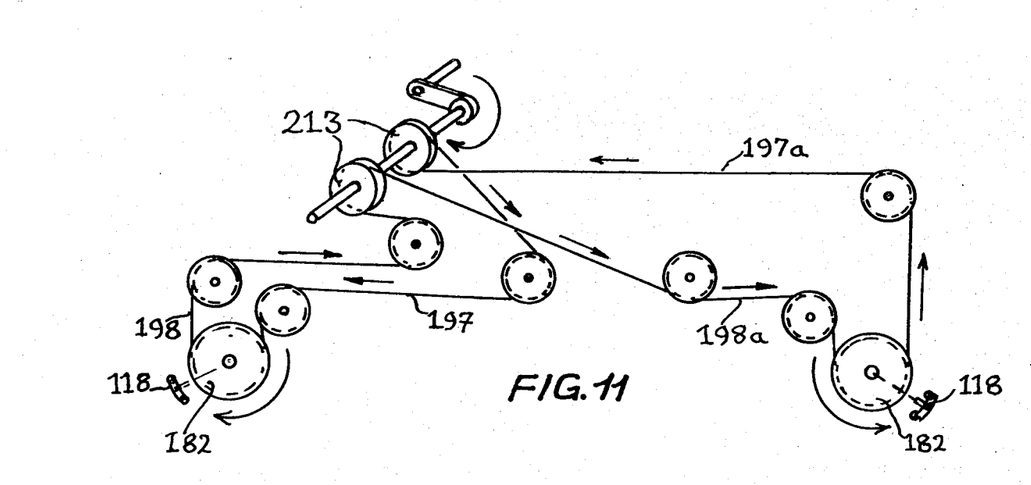
FIG. 11 shows diagrammatically how the carriers of the apparatus shown in FIG. 10 may be rotated from a remote position.

Cables 173, and 173a, conveniently (see FIG. 10) are attached to a weight or weights which pull the trolley into engagement with a wheel. Return cables 178 and 178a are preferably the same cable, passing round a single sheave 210 at the free end of a lever 211. This arrangement accommodates variations both in the widths and positioning of vehicles and ensures that when the lever is rotated clockwise both trolleys are fully withdrawn. Rotation of two machines simultaneously is conveniently performed from area 202, the cables 197 and 198 and their counterparts 197a and 198a passing round a drum or drums 213 in FIG. 11, which may be rotated manually or by a motor, the latter being desirable to assure a steadier speed of movement of the spraying unit round the wheel than an unskilled operator could achieve. Means associated with the motor may be incorporated to provide control of the water supply and the application of chemicals. Conveniently, rotation of the carrier at the start of a wash is accomplished by a weight and pulley arrangement. The weight can be suspended in the control area, 202, or preferably embodied in a mast generally as shown in FIG. 1, this reducing the number of sheaves required. The weight is only sufficient to pull the nozzle unit round its operational arc: if there is any obstruction in its path, the nozzle unit is brought to a stop without damage to the vehicle or the nozzle unit.

Figure 12:
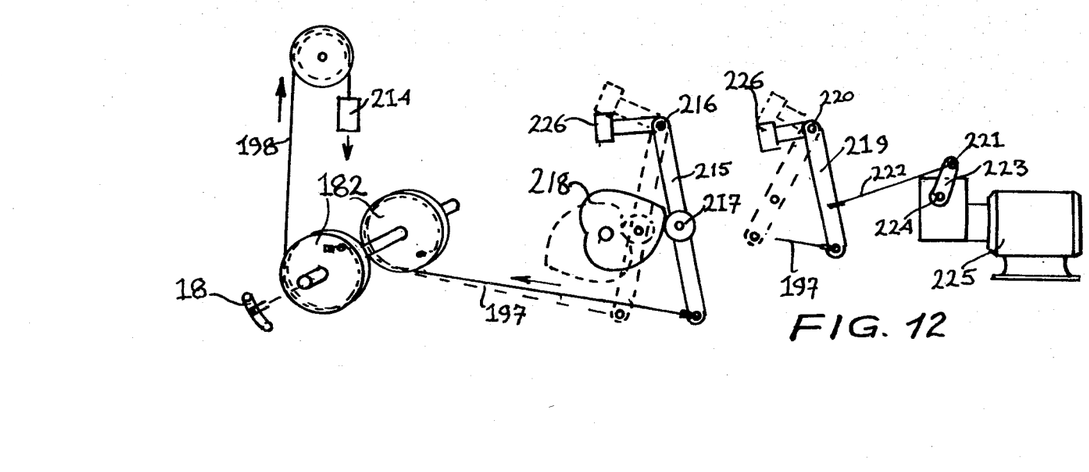
FIG. 12 shows diagrammatically a method of using a weight to rotate a carrier.

In FIG. 12, nozzle unit 18 is held in its rest position by cable 197 attached to wheel 182, against weight 214 attached to cable 198. Cable 197 is attached to the free end of a lever 215 pivoted at axis 216, embodying a cam follower 217. Rotation of the cam 218 will gradually release cable 197, allowing weight 214 to rotate the nozzle unit through its operational arc. Alternatively, cable 197 can be attached to lever 219, pivoted at axis 220, and connected by a flexible cable 222 to pin 221 at the free end of an arm 223 rotating about axis 224 powered by a geared motor 225. Small counterweight 226 prevents slack in cable 197.

What I claim is:

1. Apparatus for cleaning the wheel arches of vehicles comprising support means, a carrier pivotally mounted on said support means about a substantially horizontal pivotal axis, a spraying unit slidably mounted on the carrier and movable substantially inwards and outwards relative to the pivotal axis of the carrier, means for moving the support means whereby the spraying unit is brought into a position alongside a wheel for spraying with the pivotal axis of the carrier adjacent to and substantially parallel with the axis of the wheel, means for moving said spraying unit inwards and/or outwards in relation to said pivotal axis of said carrier and means for pivoting the carrier about the pivotal axis relative to said support means.

2. Apparatus as claimed in claim 1, in which the inward and outward movement of the spraying unit in relation to the pivotal axis of the carrier is associated with pivotal movement of a lever associated with said carrier.

3. Apparatus as claimed in claim 2 wherein the lever is in the form of a bellcrank.

4. Apparatus as claimed in claim 2 or 3 in which the means for moving said spraying unit inwards in relation to the pivotal axis of the carrier comprise springing means associated with said lever.

5. Apparatus as claimed in claim 4 wherein said springing means are alternatively brought into or out of action by the pivotal movement of said carrier.

6. Apparatus as claimed in claim 1 wherein the means for moving the spraying unit outwards in relation to the pivotal axis of the carrier comprise a linkage actuated by the pivotal movement of said carrier.

7. Apparatus as claimed in claim 2 wherein the lever is associated with a counterweight exerting a force on the lever substantially in the opposite direction to the force exerted by the spraying unit.

8. Apparatus as claimed in claim 1 in which the arrangement is such that the inward and outward movement of the spraying unit is controlled at either end of the arc through which the carrier is pivoted.

9. Apparatus as claimed in claim 1 in which the spraying unit includes a member substantially perpendicular to the axis of the carrier but remote from the carrier itself, the member being provided with rolling or sliding means adapted to follow the edge of a wheel or the wall of a tyre.

10. Apparatus as claimed in claim 1 wherein the spraying unit includes a member substantially parallel with the axis of the carrier the member being provided directly or indirectly with rolling or sliding means adapted to follow the periphery of a tyre.

11. Apparatus as claimed in claim 10 wherein a nozzle unit comprising a plurality of nozzles is pivotally attached to the member substantially parallel with the axis of the carrier.

12. Apparatus as claimed in claim 11 wherein the nozzle unit is provided with rollers on one or more axes separate from but adjacent and substantially parallel to the axis on which the nozzle unit is pivoted.

13. Apparatus as claimed in claim 11 or claim 12, wherein the nozzle unit comprises one or more nozzles arranged to direct water substantially at a tangent to the periphery of a wheel or at an angle between the said tangent and the radius of the wheel and a second nozzle or combination of nozzles arranged to direct water generally in the opposite direction to the said tangent or at an angle between the opposite tangent and the radius.

14. Apparatus as claimed in claim 13 wherein means are provided for supplying water independently to the opposed nozzle or sets of nozzles.

15. Apparatus as claimed in claim 14 wherein the means of supplying water to the nozzles are pivotally connected to the nozzle unit.

16. Apparatus as claimed in claim 1 wherein said spraying unit comprises one or more nozzles adapted to direct water towards the depending portion of a mudguard.

17. Apparatus as claimed in claim 11 wherein at least one additional nozzle is provided for directing fluid towards the surfaces of the wheel arch in addition to the nozzles provided for cleaning said surfaces.

18. Apparatus as claimed in claim 1 wherein the spraying unit is provided with nozzles adapted to clean the outer surfaces of a wheel.

19. Apparatus as claimed in claim 1 wherein the support means comprises a trolley movable into a position adjacent the wheel whose surrounding arch is to be cleaned.

20. Apparatus as claimed in claim 1 wherein the means for moving the support means form part of or operate in association with car wash apparatus of a gantry type.

21. Apparatus as claimed in claim 1 wherein the means for moving the support means form part of an assembly for washing more than one wheel arch of a vehicle simultaneously.

22. Apparatus as claimed in claim 1, wherein the carrier is connected to flexible elongated means enabling the carrier to be pivoted from a remote position.

23. Apparatus as claimed in claim 22, and including guide means for guiding said flexible elongated means during movement of said support means and means mounting said guide means in such a manner that the guide means define a guide path the length of which remains constant during movement of the support means towards and away from a wheel.

24. Apparatus as claimed in claim 23, wherein said means mounting the guide means comprises an arm having first and second links pivotably connected to one another at or adjacent to one end thereof, the first arm being pivotably connected at or adjacent to the other end thereof to a fixed point and the second arm being pivotably connected at or adjacent to the other end thereof to said support means.

25. Apparatus as claimed in claim 24, wherein means are provided for retaining said flexible elongated means in tension against said guide means during said movement of the support means during which the arm will pivot.

26. Apparatus as claimed in claim 25, wherein said guide means comprises first, second and third sheaves rotatable about the pivot axis of said other end of the first arm, the pivot axis of said other end of the second arm and the axis about which the two arms pivot relatively to each other respectively.

27. Apparatus as claimed in claim 24, wherein the arm is connected to further flexible elongated means enabling the arm to be pivoted so as to effect movement of the support means from a remote position.

28. Apparatus as claimed in claim 27, wherein guide means are provided for guiding said further flexible elongated means between said arm and a remote position.

29. Apparatus as claimed in claim 28, wherein said guide means includes one or more rotatably mounted sheaves.

30. Apparatus as claimed in claim 19, wherein the trolley is mounted on a pair of spaced parallel tracks for movement therealong.

31. Apparatus as claimed in claim 24 wherein the means for moving the support means of the carrier comprises a trolley movable on spaced parallel tracks into a position adjacent the wheel arch to be cleaned and said arm is disposed between the tracks.

32. Apparatus as claimed in claim 1, wherein pivotable movement of the carrier in one direction is effected by a mass acting under the influence of gravity.

33. Apparatus as claimed in claim 1 wherein the means for pivoting the carrier relative to the support means comprises at least one cam.

34. Apparatus as claimed in claim 33 wherein a drive of the cam also controls the supply of water and/or chemicals to the spraying unit.

35. An assembly comprising two apparatuses as claimed in claim 1 the two apparatuses being mounted in spaced relationship and opposite to each other in such a manner that a vehicle may pass between them, means being provided to locate the assembly and a vehicle relative to each other while an opposed pair of wheels of the vehicle is being washed.

36. Apparatus as claimed in claim 1, further comprising means responsive to an angular position of the carrier for controlling the supply of water and/or chemicals to the spraying unit.

* * * * *